US008643698B2

(12) United States Patent
Chen et al.

(10) Patent No.: US 8,643,698 B2
(45) Date of Patent: Feb. 4, 2014

(54) METHOD AND SYSTEM FOR TRANSMITTING A 1080P60 VIDEO IN 1080I FORMAT TO A LEGACY 1080I CAPABLE VIDEO RECEIVER WITHOUT RESOLUTION LOSS

(75) Inventors: Xuemin Chen, Rancho Sante Fe, CA (US); Jason Herrick, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 456 days.

(21) Appl. No.: 12/825,189

(22) Filed: Jun. 28, 2010

(65) Prior Publication Data

US 2011/0050851 A1 Mar. 3, 2011

Related U.S. Application Data

(60) Provisional application No. 61/237,349, filed on Aug. 27, 2009.

(51) Int. Cl.
*H04N 13/00* (2006.01)
*H04N 15/00* (2006.01)
*H04N 7/01* (2006.01)
*H04N 11/20* (2006.01)

(52) U.S. Cl.
USPC 348/43; 348/446; 348/E07.003; 348/E13.001

(58) Field of Classification Search
USPC .......................................................... 348/43
See application file for complete search history.

(56) References Cited

U.S. PATENT DOCUMENTS

| 6,392,706 | B1 * | 5/2002 | Sugiyama ...................... 348/458 |
| 2003/0026199 | A1 * | 2/2003 | Myers ............................ 370/208 |
| 2007/0086528 | A1 * | 4/2007 | Mauchly et al. ......... 375/240.24 |
| 2010/0033622 | A1 * | 2/2010 | Bellers et al. ................. 348/448 |

* cited by examiner

*Primary Examiner* — David Czekaj
*Assistant Examiner* — Nam Pham
(74) *Attorney, Agent, or Firm* — Thomas | Horstemeyer, LLP (57) ABSTRACT

A single progressive 1080P60 side-by-side 3D video or a single progressive 1080P60 2D video is captured for transmission to interlaced receivers such as a legacy 1080i capable video receiver. A video transmitter splits the captured 1080P60 video into a plurality of even-indexed line pictures and odd-indexed line pictures. Lines of the plurality of even-indexed line pictures and odd-indexed line pictures are reassembled to generate two interlaced video sequences such as two 1080i video sequences. The video transmitter compresses the generated two 1080i video sequences, respectively, utilizing different compression algorithms, for example. Pictures that originate from the same one of the plurality of pictures in the captured 1080P60 video may be synchronized for a progressive display at the legacy 1080i capable video receiver. The legacy 1080i capable video receiver may decode the synchronized pictures from the video transmitter so as to restore the captured 1080P60 video for display in progressive format.

20 Claims, 8 Drawing Sheets

METHOD AND SYSTEM FOR TRANSMITTING A 1080P60 VIDEO IN 1080I FORMAT TO A LEGACY 1080I CAPABLE VIDEO RECEIVER WITHOUT RESOLUTION LOSS

CROSS-REFERENCE TO RELATED APPLICATIONS/INCORPORATION BY REFERENCE

This patent application makes reference to, claims priority to and claims the benefit from U.S. Provisional Patent Application Ser. No. 61/237,349 filed on Aug. 27, 2009.

This application makes reference to:
U.S. Application Ser. No. 61/232,123 filed on Aug. 7, 2009; and
U.S. Application Ser. No. 61/266,553 filed on Dec. 4, 2009.

Each of the above stated applications is hereby incorporated herein by reference in its entirety.

FIELD OF THE INVENTION

Certain embodiments of the invention relate to video processing. More specifically, certain embodiments of the invention relate to a method and system for transmitting a 1080P60 video in 1080i format to a legacy 1080i capable video receiver without resolution loss.

BACKGROUND OF THE INVENTION

Most consumer video is captured in two video fields, even fields and odd fields, per video frame. An even field comprises the pixel information only for even lines, while the odd field comprises pixel information only for odd lines. The adjacent odd and even fields are interlaced with each other so as to remove objectionably perceptible flicker from display on various display device such as, for example, a TV a computer monitor and a projector.

A display device may be operable to display the content of the captured video using either a progressive display technique or an interlaced display technique. The progressive display technique displays both even and odd fields per video frame, simultaneously. The interlaced display technique displays one field after the other subsequently. Different display devices may use different display techniques. For example, to display contents of the captured video, a computer monitor may utilize the progressive display technique, while an interlaced television may utilize the interlaced technique.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for transmitting a 1080P60 video in 1080i format to a legacy 1080i capable video receiver without resolution loss, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a method and/or system for transmitting a 1080P60 video in 1080i format to a legacy 1080i capable video receiver without resolution loss. In various embodiments of the invention, a single progressive video such as a single 1080P60 side-by-side 3D video, and/or a single 1080P60 2D video is captured for transmission to one or more interlaced receivers such as a legacy 1080i capable video receiver. A video transmitter may be operable to format the captured 1080P60 video prior to transmission to conserve transmission bandwidths. In this regard, two interlaced video sequences such as 1080i video sequences may be generated or created from the captured 1080P60 video. The video transmitter may be operable to process the generated two 1080i video sequences for transmission in interlaced format to the legacy 1080i capable video receiver. To generate the two 1080i video sequences, the video transmitter may split the captured 1080P60 video into a plurality of even-indexed line pictures and odd-indexed line pictures. Specifically, each frame of the captured 1080P60 video may be split into an even-indexed line picture and an odd-indexed line picture. Lines of the plurality of even-indexed line pictures and odd-indexed line pictures may be reassembled to generate or form the two 1080i video sequences. The generated two 1080i video sequences may be independently compressed. Pictures, which originate from the same one of the plurality of pictures in the captured 1080P60 video, may be synchronized for a progressive display at the legacy 1080i capable video receiver. A progressive display refers to as a full frame display at a particular time instant. The legacy 1080i capable video receiver may be operable to decode the synchronized pictures from the video transmitter to restore the captured 1080P60 video for display in progressive format.

Figure 1:
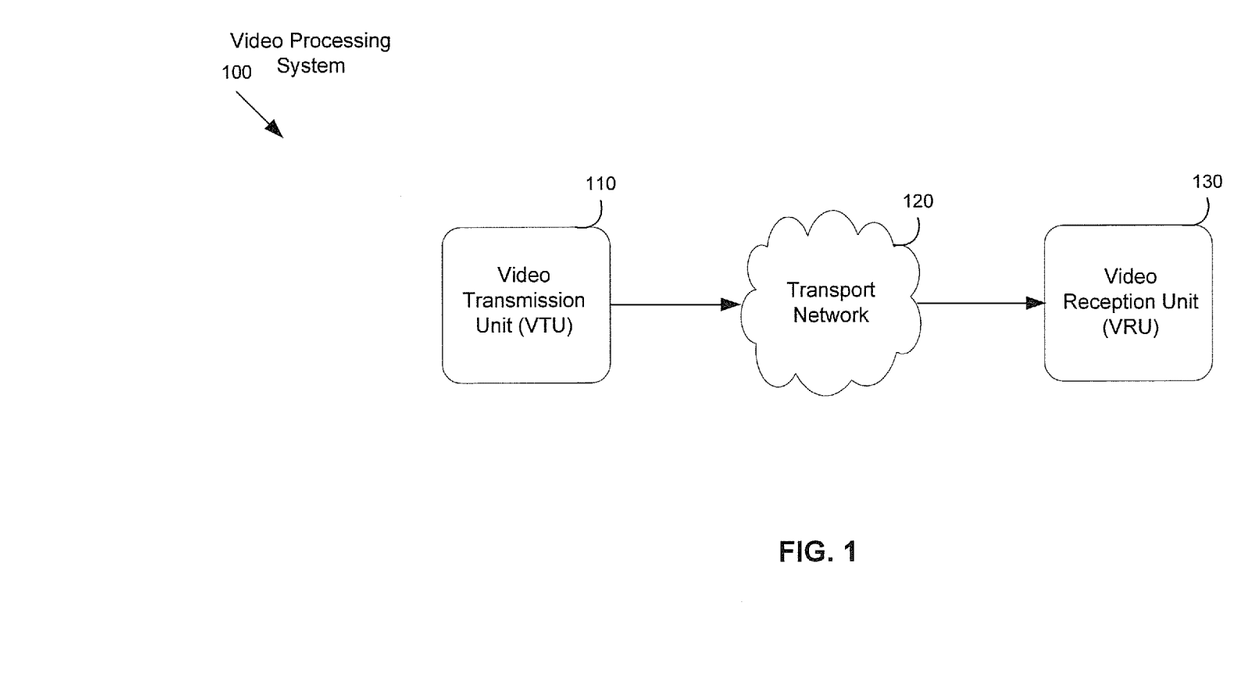
FIG. 1 is a block diagram of an exemplary video processing system that is operable to transmit a 1080P60 video in 1080i format to a legacy 1080i capable video receiver without resolution loss, in accordance with an embodiment of the invention.

FIG. 1 is a block diagram of an exemplary video processing system that is operable to transmit a 1080P60 video in 1080i format to a legacy 1080i capable video receiver without resolution loss, in accordance with an embodiment of the invention. Referring to FIG. 1, there is shown a video processing system 100. The video processing system 100 comprises a video transmission unit (VTU) 110, a transport network 120, and a video reception unit (VRU) 130.

The VTU 110 may comprise suitable logic, circuitry, interfaces and/or code that may be operable to provide coded or compressed video content such as, for example, three dimensional (3D) content and/or two dimensional (2D) content, to video decoders such as the VRU 130. The VTU 110 may be operable to encode or compress a video such as a 3D video and/or a 2D video into various picture formats such as, for example, 1280×720 pixels progressive format, 1920×1080 pixels interlaced format, and/or 1920×1080 pixels progressive format, which are commonly referred to as 720P, 1080i and 1080P, respectively. The prefix "720" and "1080" here refer to horizontal resolution or video resolution of the display. The suffix "i" means "interlaced".

Interlacing a single picture or frame of a video means to split the lines of samples or pixels of the single picture into a top-field and a bottom-field. Odd-indexed lines may be assigned to the top field, while even-indexed lines may be counted belonging to the bottom-field. The top-field and the bottom-field of an interlaced picture or frame may be independently encoded and transmitted to the VRU 130 for display. In this regard, half of the picture data of an interlaced frame may be transmitted to the VRU 130 for display at a particular time instant, rather than the full interlaced frame. The suffix "P" means "progressive". There are no fields, only frames in progressive format. In this regard, the entire picture data of a progressive picture may be encoded and transmitted for display at one time.

The VTU 110 may be operable to encode or compress video at various frame rates such as 24, 30 or 60 frames per second depending on applications. For example, in MPEG-2 standard, a video may be encoded in 1080i format at rate of 30 frames per second, that is, 1080i30. In high definition TV, a video may be encoded in 1080i or 1080P format at rate of 60 frames per second, 1080i60 or 1080P60. Within a given transmission time period, the same amount of picture data may be transmitted for a 1080P30 video and a 1080i60 video. Twice as much picture data may be transmitted for a 1080P60 video than for a 1080i60 or 1080P30 video. In this regard, at a given frame rate, transmission of a video in interlaced format may save or conserve half the transmission bandwidth than in progressive format.

In various embodiments of the invention, the VTU 110 may be operable to transmit or deliver a captured 1080P60 video in interlaced format while maintaining video resolution of the captured 1080P60 video. The captured 1080P60 video may be a 1080P60 side-by-side 3D video or a 1080P60 2D video depending on device capabilities. The VTU 110 may be operable to pre-format the captured 1080P60 video prior to transmission to legacy interlaced capable video receivers such as a 1080i capable video receiver. The VTU 110 may be operable to split each frame or picture of the captured 1080P60 video into an even-indexed line picture and an odd-indexed line picture, respectively, to reduce frame size. Two interlaced video sequences such as 1080i video sequence may be generated from even-indexed line pictures and odd-indexed line pictures. For example, even-indexed lines of the even-indexed line pictures and odd-indexed lines of the adjacent odd-indexed line pictures may be assembled to form a first 1080i video sequence. Odd-indexed lines of the even-indexed line pictures and even-indexed lines of the adjacent odd-indexed line pictures may be combined to form a second 1080i video sequence. The first 1080i video sequence and the second 1080i video sequence may be independently compressed or encoded for transmission. For example, the VTU 110 may be operable to compress the first 1080i video sequence utilizing interlaced coding with the top-field first. The second 1080i video sequence may be compressed utilizing interlaced coding with the bottom-field first. MPEG-2 multi-view profile (MVP) may be utilized to compress the first 1080i video sequence and the second 1080i video sequence whenever needed.

In order to enhance coding efficiency, the VTU 110 may be operable to utilize different compression algorithms to encode the first 1080i video sequence and the second 1080i video sequence to form 1080i ESs for the first 1080i video sequence and the second 1080i video sequence, respectively. The first 1080i ES and/or the second 1080i ES may be backward compatible with a legacy 1080i capable decoder. In other words, the first 1080i ES and/or the second 1080i ES may be decodable through a legacy 1080i capable decoder. A different packet identifier (PID) may be assigned by the VTU 110 to each of the first 1080i ES and the second 1080i ES.

In order to achieve a progressive display at the VRU 130, pictures that originate from the same one of the plurality of pictures in the captured 1080P60 video may be synchronized. In this regard, same timestamp information such as Decode Time Stamp (DTS) and Presentation Time Stamp (PTS) may be embedded or inserted into headers of pictures that originate from the same one of the plurality of pictures in the captured 1080P60 video. The embedded timestamp information, namely, DTS and PTS, may inform decoders when to decode and display corresponding pictures or frames. The first ES and the second ES may be packetized and multiplexed into a single transport stream (TS) for transmission to the VRU 130 over the transport network 120.

The transport network 120 may comprise suitable logic, circuitry, interfaces and/or code that may be operable to provide platforms for communication between the VTU 110 and the VRU 130, for example. The transport network 120 may be implemented as a wired, optical, and/or wireless communication network for the delivery of video, voice and/or data services. The transport network 120 may be local area network, wide area network, the Internet, and the like.

The VRU 130 may comprise suitable logic, circuitry, interfaces and/or code that may be operable to receive a transport stream from the VTU 110 over the transport network 120. The received transport stream may comprise two 1080i ESs created from a 1080P60 video that is originally captured by the VTU 110. Pictures that originate from the same one of the plurality of pictures in the captured 1080P60 video may comprise same timestamp information, namely, DTS and PTS. The two 1080i ESs in the received transport stream may be demultiplexed into a first 1080i ES and a second 1080i ES based on corresponding PIDs. The VRU 130 may be operable to decode the first 1080i ES and the second 1080i ES at the time indicated by a corresponding embedded DTS. The first 1080i ES and the second 1080i ES may be independently decoded into a first 1080i video sequence and a second 1080i video sequence, respectively. The VRU 130 may be operable to combine the first 1080i video sequence and the second 1080i video sequence so as to recover or restore the captured 1080P60 video for display in progressive format at the time indicated by corresponding PTS information.

In an exemplary operation, the VTU 110 may be operable to provide coded 3D and/or 2D video content to video decoders such as the VRU 130 over the transport network 120. In instances where a 1080P60 video is captured for transmission to legacy 1080i capable decoders such as the VRU 130, the VTU 110 may be operable to pre-format the captured 1080P60 video in order to save transmission bandwidth while maintaining video resolution of the captured 1080P-60 video at the VRU 130. In this regard, the VTU 110 may be operable to reduce the frame size utilized to transmit the captured 1080P60 video.

In an exemplary embodiment of the invention, the VTU 110 may split each frame or picture of the captured 1080P60 video into an even-indexed line picture and an odd-indexed line picture, respectively. A first 1080i sequence may be generated by combining even-indexed lines of the even-indexed line pictures and odd-indexed lines of the adjacent odd-indexed line pictures. A second 1080i sequence may be generated by assembling odd-indexed lines of the even-indexed line pictures and even-indexed lines of the adjacent odd-indexed line pictures. The first 1080i sequence and the second 1080i sequence may be compressed, respectively, utilizing different compression algorithms, for example, to save bandwidth. A different PID may be assigned to each of resulting 1080i ESs. Pictures that originate from the same one of the plurality of pictures in the captured 1080P60 video may be synchronized for a progressive display on the VRU 130. In this regard, same timestamps such as DTS and PTS may be inserted or embedded into headers of pictures created from a same one of the plurality of pictures in the captured 1080P60 video. The VTU 110 may be operable to packetize and multiplex the first 1080i ES and the second 1080i ES to form a single transport stream for transmission. Upon the reception of the transport stream from the VTU 110, the VRU 130 may be operable to demultiplex the received transport stream into a first 1080i ES and a second 1080i ES. The VRU 130 may be operable to decode frames in the first 1080i ES and the second 1080i ES to form two 1080i sequences. The two 1080i sequences may be combined to recover or restore the 1080P60 captured by the VTU 110. Pictures in the restored 1080P60 video may be displayed to users at the time indicated by corresponding PTS.

Figure 2:
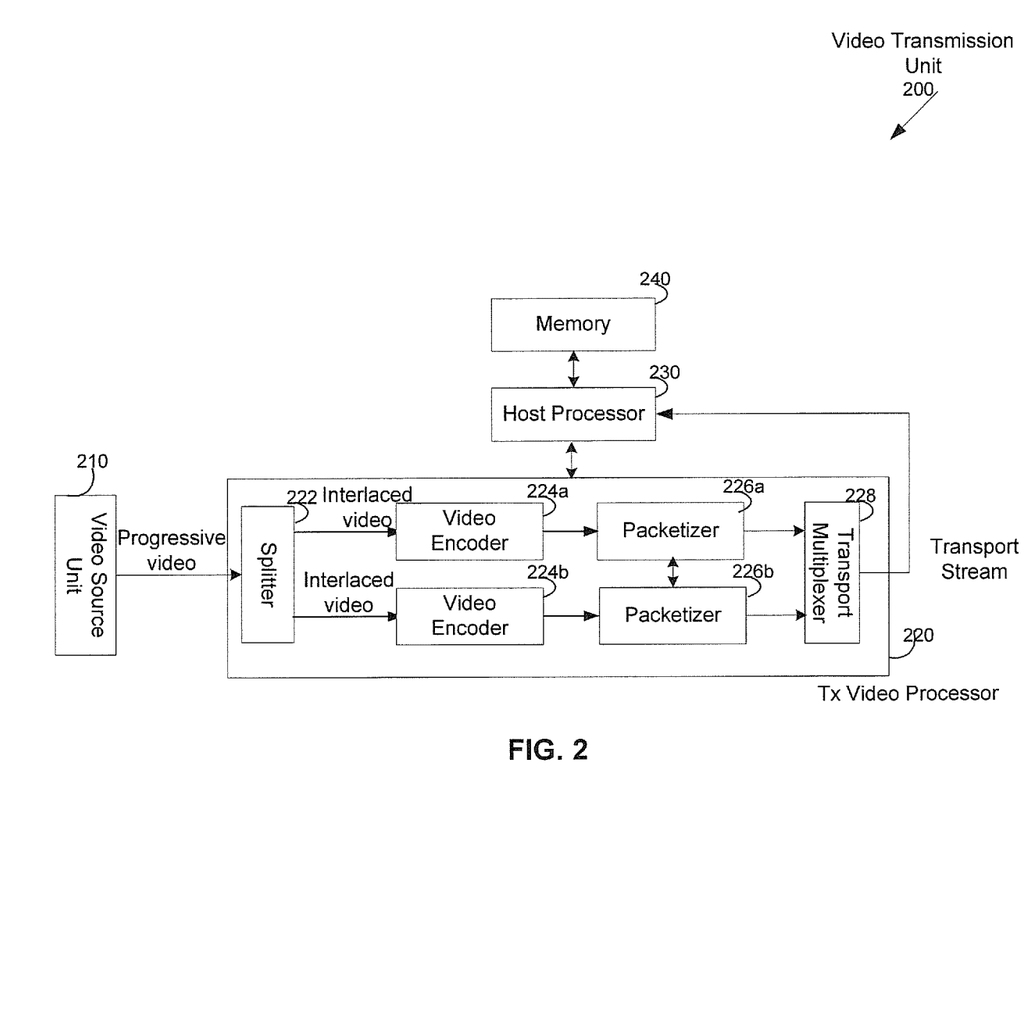
FIG. 2 is a diagram illustrating an exemplary video transmission unit that is operable to pre-format a 1080P60 video into 1080i format for transmission without resolution loss, in accordance with an embodiment of the invention.

FIG. 2 is a diagram illustrating an exemplary video transmission unit that is operable to pre-format a 1080P60 video into 1080i format for transmission without resolution loss, in accordance with an embodiment of the invention. Referring to FIG. 2, there is shown a video transmission unit (VTU) 200. The VTU 200 comprises a video source unit 210, a transmitter (Tx) video processor 220, a host processor 230 and a memory 240.

The video source unit 210 may comprise suitable logic, circuitry, interfaces and/or code that may be operable to capture source video for transmission. Depending on device capabilities, the captured source video may comprise 3D video (e.g. in the side-by-side format) and/or 2D video. In this regard, the captured source video may comprise a 1080P60 video. The video source unit 210 may be operable to communicate the captured 1080P60 video to the Tx video processor 220 for transmission to legacy 1080i capable decoders such as the VRU 130.

The Tx video processor 220 may comprise suitable logic, circuitry, interfaces and/or code that may be operable to process source videos captured by the source video unit 210. In instances where a 1080P-60 video is captured by the source video unit 210, the Tx video processor 220 may be configured to pre-format the captured 1080P60 video to reduce transmission bandwidth while maintaining the video resolution of the captured 1080P60 video at a target legacy 1080i decoder such as the VRU 130. The Tx video processor 220 may comprise a splitter 222, video encoders 224a-224b, packetizers 226a-226b and a transport multiplexer 228.

The splitter 222 may comprise suitable logic, circuitry, interfaces and/or code that may be operable to split each frame or picture of the 1080P60 video into an even-indexed line picture and an odd-indexed line picture to form two 1080i video sequences with a reduced frame size. For example, the splitter 222 may be operable to assemble even lines of the even-indexed line pictures and odd-indexed lines of the adjacent odd line pictures to form the first 1080i video sequence. Odd lines of the even-indexed line pictures and even lines of the adjacent odd-indexed line pictures may be combined to form the second 1080i video sequence. The splitter 222 may be operable to communicate the first 1080i video sequence and the second 1080i video sequence to the video encoders 224a and 224b, respectively, for video compression.

The video encoders 224a and 224b may comprise suitable logic, circuitry, interfaces and/or code that may be operable to encode or compress the first 1080i video sequence and the second 1080i video sequence, respectively. The video encoders 224a and 224b may be operable to utilize various video compression algorithms such as video compression algorithms specified in MPEG-2, and/or other video formats to form ESs for the first 1080i video sequence and the second 1080i video sequence, respectively. Different compression algorithms may be applied to the first 1080i video sequence and the second 1080i video sequence to conserve bandwidth. For example, coding information such as the scene information from the first 1080i video sequence coding may be utilized for the second 1080i video sequence coding.

The packetizers 226a-226b may comprise suitable logic, circuitry, interfaces and/or code that may be operable to packetize ESs from the video encoders 224a-224b for transmission. For example, the packetizer 226a may be operable to packetize the ES from the video encoder 224a to form a Packetized ES (PES). Packet sizes utilized in the PES may vary. Timestamp information such as DTS and PTS may be embedded or inserted into headers of the PES to inform decoders when to decode and to present pictures in the PESs. In this regard, same timestamp information may be embedded in headers of PESs for pictures associated with a same one of a plurality of pictures or frames in the captured 1080P60 video. The PESs of the ESs from the video encoders 224a and 224b may further be broken into transport stream (TS) packets, respectively, for transmission.

The transport multiplexer 228 may comprise suitable logic, circuitry, interfaces and/or code that may be operable to merge or multiplex TS packets from the packetizers 226a and 226b into a single video stream, namely a transport stream (TS), for transmission over the transport network 120.

The host processor 230 may comprise suitable logic, circuitry, interfaces and/or code that may be operable to control and manage associated device components such as, for example, the splitter 222 and the video encoders 224a-224b. The host processor 230 may be operable to set up a frame size and a frame rate for video compression based on available transmission bandwidth and/or system capacities such as decoder capacities.

The memory 240 may comprise suitable logic, circuitry, interfaces and/or code that may be operable to store information such as executable instructions and data that may be utilized by the VTU 200. The executable instructions may comprise various video compression algorithms that may be utilized to compress video via the video encoders 204a through 204b. The data may comprise captured source video, compressed video and/or transport stream data. The memory 240 may comprise RAM, ROM, low latency nonvolatile memory such as flash memory and/or other suitable electronic data storage.

In an exemplary operation, the video source unit 210 may be operable to capture a source video, either a 3D video (e.g. in the side-by-side format) or a 2D video, such as a 1080P60 video for transmission to 1080i capable decoders such as the VRU 130. The host processor 230 may be operable to determine a frame size and a frame rate that may be utilized for transmitting the captured 1080P60 video to the VRU 130. The frame size and the frame rate may be determined based on available transmission bandwidth and/or decoder capacities. In instances where the VRU 130 is 1080i capable, the captured 1080P60 video may be pre-formatted prior to transmission. In this regard, the splitter 222 may be operable to split each frame or picture of the captured 1080P60 video into an even-indexed line picture and an odd-indexed line picture, respectively. Two 1080i video sequences may be formed from resulting even-indexed line pictures and adjacent odd-indexed line pictures. The two 1080i video sequences may be independently compressed to form corresponding ESs. Different PIDs may be assigned to the corresponding ESs from the video encoders 224a and 224b, respectively. The packetizers 226a and 226b may packetize the ESs from the video encoders 224a and 224b to form corresponding PESs. In this regard, same timestamp information may be inserted or embedded in headers of PESs for pictures or frames associated with a same picture of the captured 1080P60 video. The packetizers 226a and 226b may packetize corresponding PESs into TS packets. The transport multiplexer 228 may be operable to multiplex TS packets from the packetizers 226a and 226b into a single TS for transmission.

Figure 3:
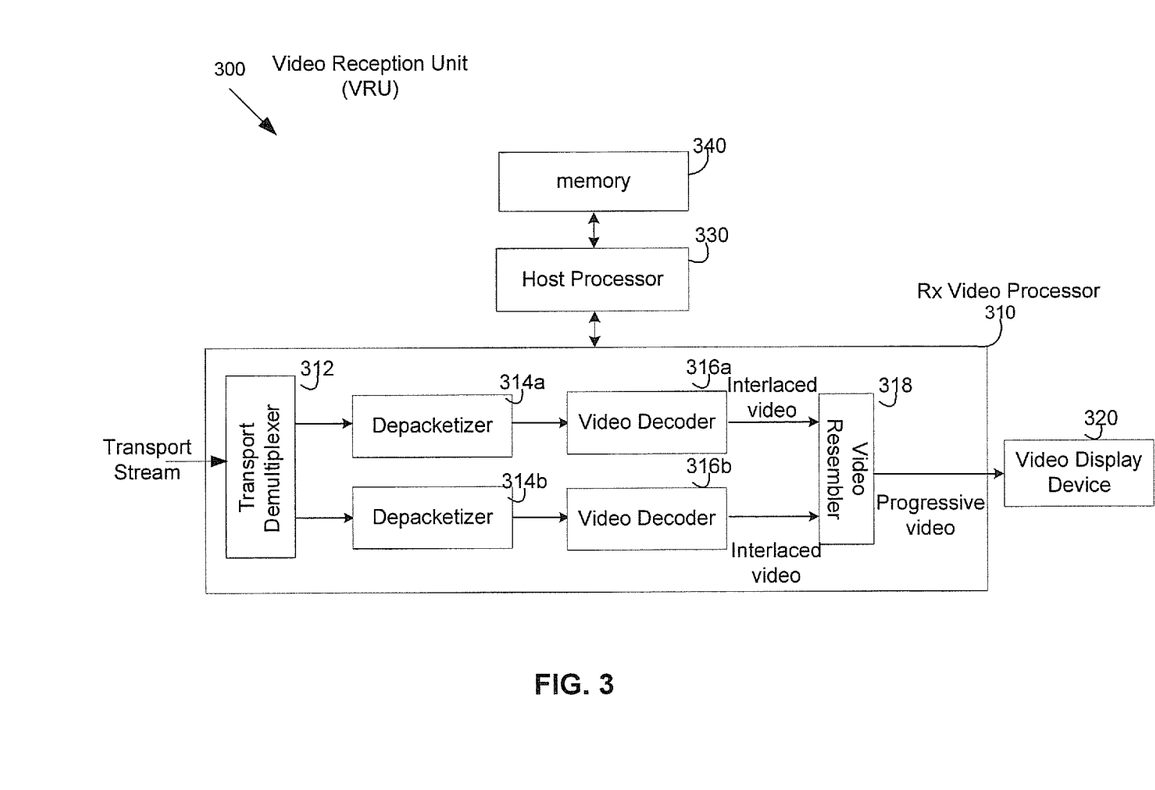
FIG. 3 is a diagram illustrating an exemplary video reception unit that is operable to display a 1080P60 video that is received in interlaced format, in accordance with an embodiment of the invention.

FIG. 3 is a diagram illustrating an exemplary video reception unit that is operable to display a 1080P60 video that is received in interlaced format, in accordance with an embodiment of the invention. Referring to FIG. 3, there is shown a video reception unit (VRU) 300. The VRU 300 comprises a receiver (Rx) video processor 310, a video display device 320, a host processor 330 and a memory 340.

The Rx video processor 310 may comprise suitable logic, circuitry, interfaces and/or code that may be operable to process video data such as a TS received from the VTU 200. The received TS may comprise TS packets of two different ESs that are created from a source video such as a 1080P60 video, side-by-side 3D or 2D, captured by the video source unit 210. The Rx video processor 310 may be operable to recover the captured 1080P60 video from the received TS for display on the video display device 320. The Rx video processor 310 may comprise a transport demultiplexer 312, depacketizers 314a-314b, video decoders 316a-316b and a video resembler 318.

The transport demultiplexer 312 may comprise suitable logic, circuitry, interfaces and/or code that may be operable to demultiplex or parse the TS received from the VTU 200. The received TS may comprise TS packets generated by the packetizers 226a and 226b, respectively. The transport demultiplexer 310 may extract the TS packets from the packetizers 226a and 226b based on corresponding PIDs. The extracted TS packets from the packetizers 226a and 226b may be further processed via the depacketizers 314a and 314b, respectively.

The depacketizers 314a-314b may comprise suitable logic, circuitry, interfaces and/or code that may be operable to assemble TS packets into PESs. TSs from the transport demultiplexer 310 may be assembled to recover PESs from the video encoders 224a-224b. In this regard, headers of the recovered PESs from the video encoders 224a-224b comprise same timestamp information such as DTS and PTS for pictures or frames that originate from the same picture of the captured 1080P60 video.

The video decoders 316a-316b may comprise suitable logic, circuitry, interfaces and/or code that may be operable to decode or decompress the recovered PESs from the video encoders 224a-224b into a first 1080i video sequence and a second 1080i video sequence. The decoding may be performed at the time indicated by PTS information embedded in headers of corresponding recovered PESs.

The video resembler 318 may comprise suitable logic, circuitry, interfaces and/or code that may be operable to resemble or combine the first 1080i video sequence and the second 1080i video sequence to form an estimate of the captured 1080P60 video. The estimated 1080P60 source video may be presented on the display device 320 to users.

The video display device 320 may comprise suitable logic, circuitry, and/or code that may be operable to display frames or pictures received from the resembler 318 at the time indicated by DTS information embedded in headers of associated PESs.

The host processor 330 may comprise suitable logic, circuitry, interfaces and/or code that may be operable to manage and control operations of device components such as, for example, the transport demultiplexer 312, the video decoders 314a-314b and/or the video resembler 318.

The memory 340 may comprise suitable logic, circuitry, interfaces and/or code that may be operable to store information such as executable instructions and data that may be utilized by the VRU 300. The executable instructions may comprise various video compression algorithms that may be utilized by the video decoders 316a-316b. The data may comprise transport stream data, compressed video and/or decompressed video. The memory 340 may comprise RAM, ROM, low latency nonvolatile memory such as flash memory and/or other suitable electronic data storage.

In an exemplary operation, a TS that is associated with a 1080P60 video captured by the source video unit 210 may be received from the VTU 200. The transport demultiplexer 312 may be operable to demultiplex the received TS into TS packets. The depacketizers 314a and 314b may be operable to compose or combine the TS packets into two PESs based on corresponding PIDs. The video decoder 316a and 316b may decode the two PESs at the time indicated by corresponding DTS information to form a first 1080i video sequence and a second 1080i video sequence, respectively. The resembler 318 may be operable to recover the captured 1080P60 video from the first 1080i video sequence and the second 1080i video sequence for display. Frames of the recovered 1080P60 video may be displayed on the display device 320 at the time indicated by corresponding PTS information.

Figure 4A:
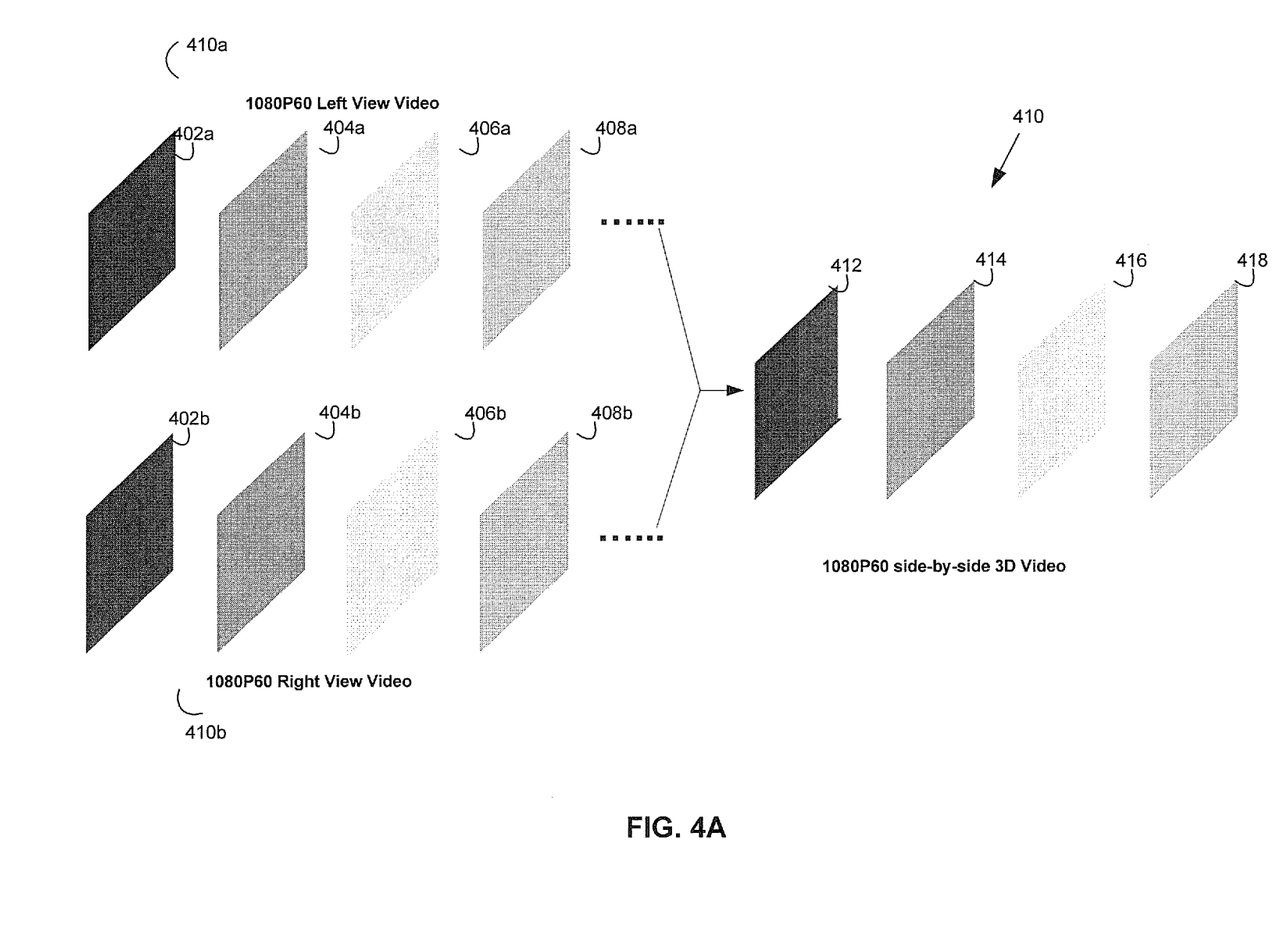
FIG. 4A is a diagram illustrating an exemplary process for converting left and right views of a 1080P60 3D video into a single 1080P60 side-by-side 3D video, in accordance with an embodiment of the invention.

FIG. 4A is a diagram illustrating an exemplary process for converting left and right views of a 1080P60 3D video into a single 1080P60 side-by-side 3D video, in accordance with an embodiment of the invention. Referring to FIG. 4A, there are shown a 1080P60 left view video 410a, a 1080P60 right view video 410b and a 1080P60 side-by-side 3D video 410.

The 1080P60 left view video 410a and the 1080P60 right view video 410b are the left and right views of a captured 1080P60 3D video and each comprises a plurality of pictures, of which pictures 402a-408a and pictures 402b-408b are illustrated, respectively. The 1080P60 left view video 410a and the 1080P60 right view video 410b may be converted into the 1080P60 side-by-side 3D video 410 by horizontally combining each frame or picture of the 1080P60 left view video 410a with corresponding frame or picture of the 1080P60 right view video 410*b* to fit side-by-side in a single picture of the 1080P60 side-by-side 3D video 410. In other words, each frame or picture of the 1080P60 side-by-side 3D video 410 comprises a picture in the 1080P60 left view video 410*a* and a corresponding picture in the 1080P60 right view video 410*b* being horizontally placed side-by-side. For example, the picture 402*a* in the 1080P60 left view video 410*a* and the picture 402*b* in the 1080P60 right view video 410*b* may be horizontally squeezed to fit side by side in the picture 412.

Figure 4B:
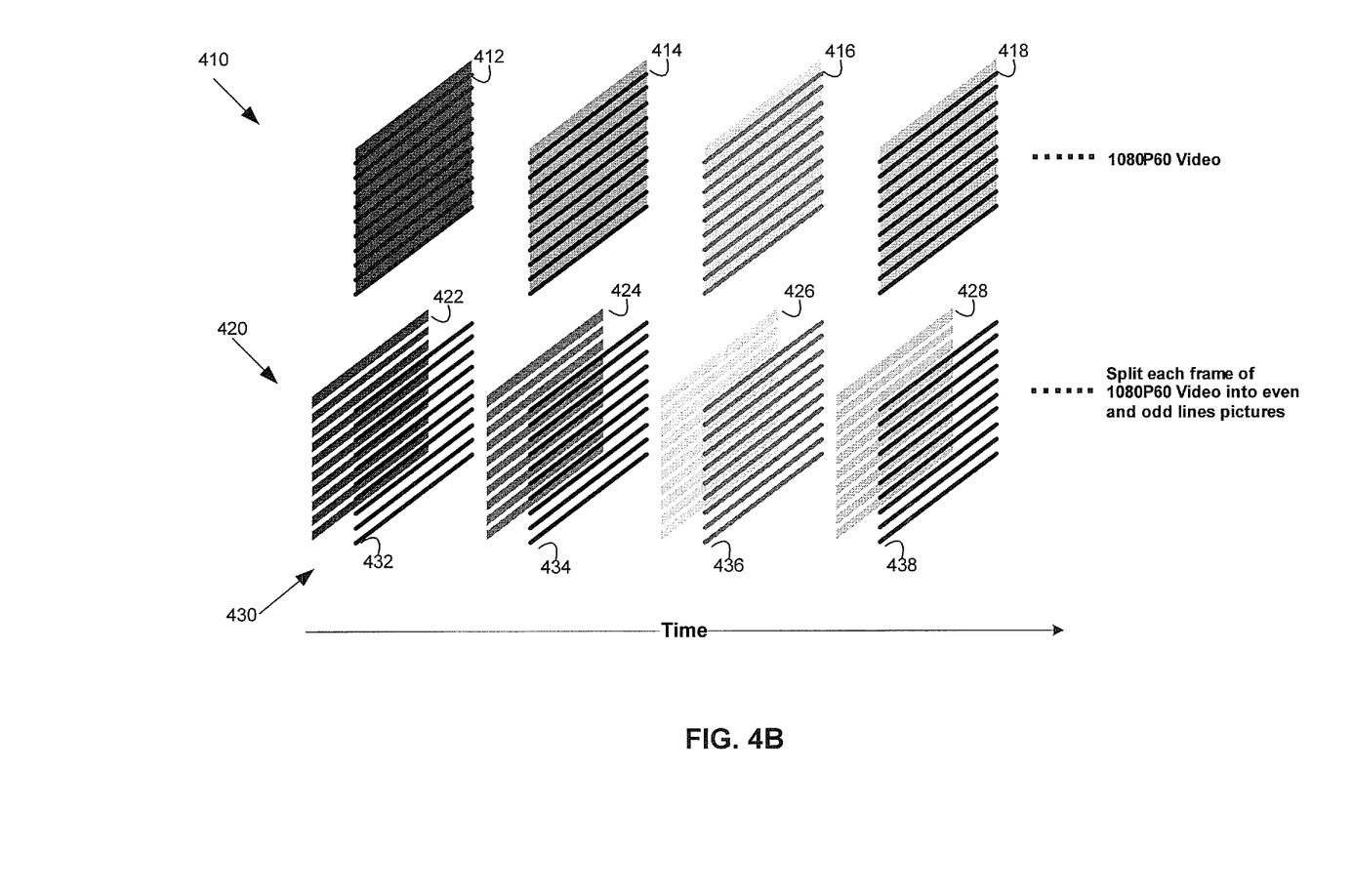
FIG. 4B is a diagram illustrating an exemplary process of splitting a 1080P60 video into even and odd line pictures, in accordance with an embodiment of the invention.

FIG. 4B is a diagram illustrating an exemplary process of splitting a 1080P60 video into even and odd line pictures, in accordance with an embodiment of the invention. Referring to FIG. 4B, there is shown a 1080P60 video 410 comprising a plurality of pictures, of which pictures 412-418 are illustrated. Two sequences 420 and 430 are 1080i video sequences produced from the 1080P60 video 410. Each frame or picture of the 1080P60 video 410 may be split into an even-indexed line picture and an odd-indexed line picture, respectively. For example, the picture 412 of the 1080P60 video 410 is split into the picture 422 and the picture 432, respectively. The picture 422 may comprise odd-indexed lines of the picture 412. The picture 432 may comprise even-indexed lines of the picture 412. The odd-indexed line pictures form the sequence 420. The even-indexed line pictures form the sequence 430.

Figure 5:
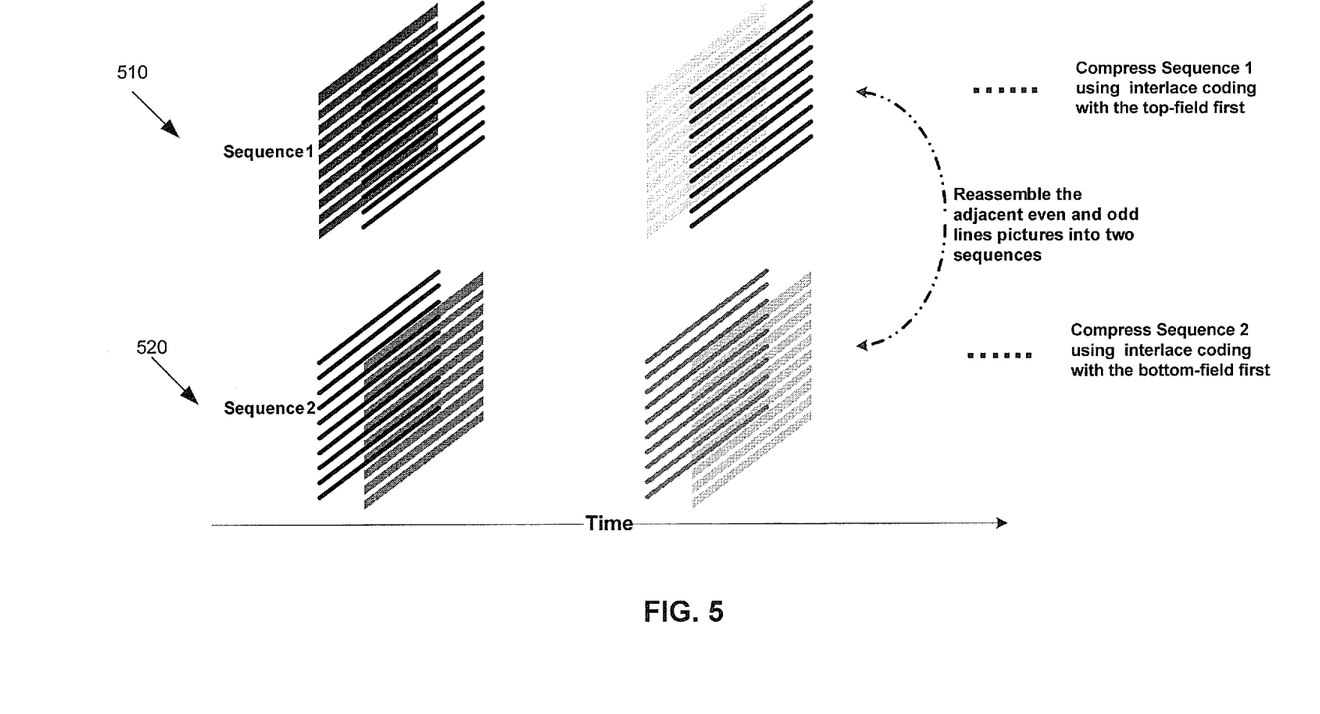
FIG. 5 is a diagram illustrating an exemplary process to form two 1080i sequences from a 1080P60 video, in accordance with an embodiment of the invention.

FIG. 5 is a diagram illustrating an exemplary process to form two 1080i sequences from a 1080P60 video, in accordance with an embodiment of the invention. Referring to FIG. 5, there are shown two 1080i video sequences 510 and 520. The 1080i video sequences 510 and 520 are formed by assembling pictures in the sequence 420 and pictures in the sequence 430. For example, even-indexed lines of the pictures in the sequence 420 and odd-indexed lines of the pictures in the sequence 430 may be utilized to form the first 1080i video sequence 510. Odd-indexed lines of the pictures in the sequence 420 and even-indexed lines of the pictures in the sequence 430 form the second 1080i video sequence 520. The first 1080i video sequence 510 and the second 1080i video sequence 520 may be compressed independently. For example, the first 1080i video sequence 510 may be interlaced coded with the top-field first. The second 1080i video sequence 520 may be interlaced coded with the bottom-field first.

Figure 6:
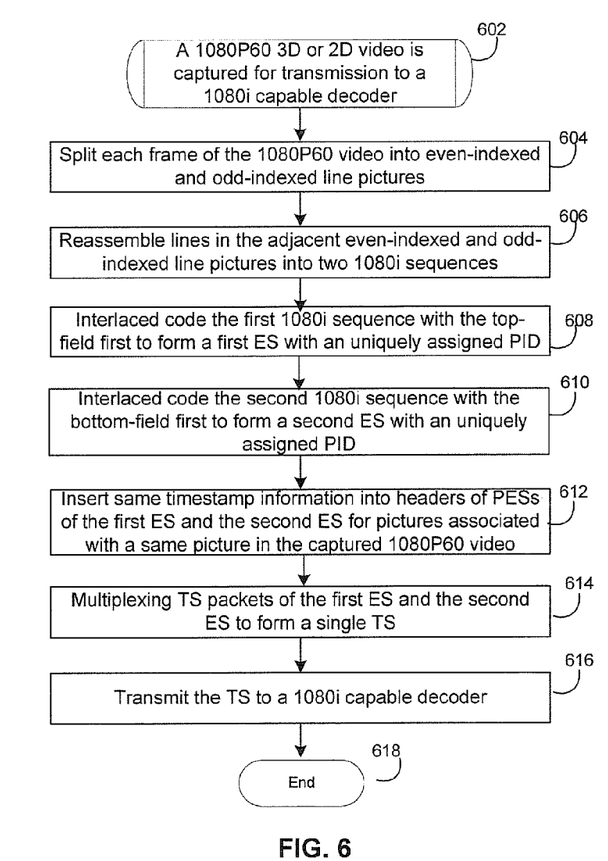
FIG. 6 is a flow chart illustrating exemplary steps for pre-formatting a 1080P60 video into 1080i format for transmission without resolution loss, in accordance with an embodiment of the invention.

FIG. 6 is a flow chart illustrating exemplary steps for pre-formatting a 1080P60 video into 1080i format for transmission without resolution loss, in accordance with an embodiment of the invention. Referring to FIG. 6, the exemplary steps start with step 602, a 1080P60 video such as the 1080P60 410 may be captured by the video source unit 210 for transmission to a legacy 1080i capable decoder such as the VRU 300. In step 604, the splitter 222 may be operable to split each frame of the captured 1080P60 video 410 into even-indexed and odd-indexed line pictures such as pictures in the sequences 420 and 430. In step 606, the splitter 222 may be operable to reassemble lines in even-indexed and adjacent odd-indexed line pictures to form two interlaced video sequences such as the 1080i video sequences 510 and 520. For example, even-indexed lines of an even-indexed line picture in the sequence 420 may be combined with odd-indexed lines of an adjacent odd-indexed picture in the sequence 430 to form a picture in the first 1080i video sequence 510. Odd-indexed lines of the even-indexed line picture in the sequence 420 may be combined with even-indexed lines of the adjacent odd-indexed picture in the sequence 430 to form a picture in the second 1080i video sequence 530.

In step 608, the video encoder 214*a* may be operable to compress the first 1080i sequence 510 utilizing interlaced coding with the top-field first to form a first ES with a uniquely assigned PID. In step 610, the video encoder 214*b* may be operable to interlaced code the second 1080i sequence 520 with the bottom-field first to form a second ES with a uniquely assigned PID. In step 612, same timestamp information such as DTS and PTS may be inserted or embedded into headers of PESs of the first ES and the second ES for pictures associated with a same one of a plurality of pictures in the captured 1080P60 video 410. In step 614, TS packets of the first ES and the second ES may be multiplexed via the transport multiplexer 228 to form a single TS for transmission. In step 616, the TS may be transmitted to a 1080i capable decoder such as the VRU 300 over the transport network 120. The exemplary steps may end in step 618.

Figure 7:
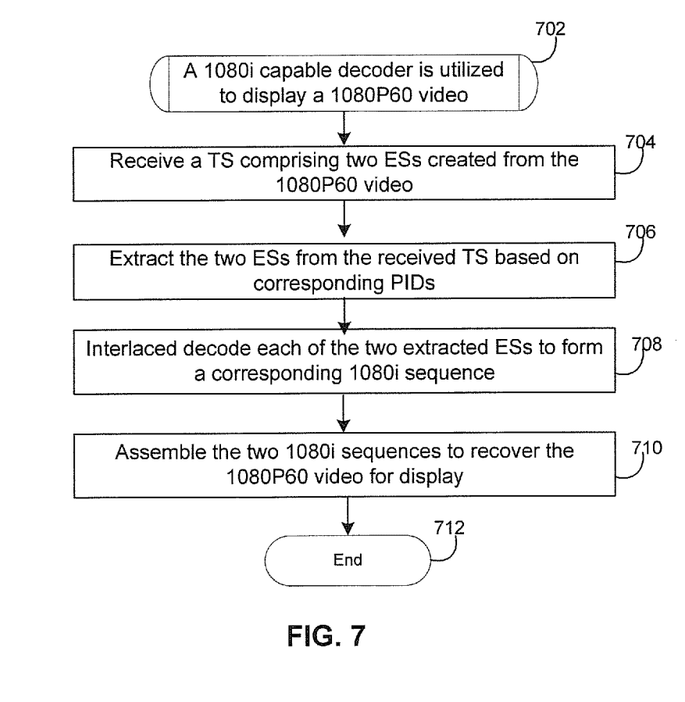
FIG. 7 is a flow chart illustrating exemplary steps for presenting a 1080P60 video that is received in interlaced format without resolution loss, in accordance with an embodiment of the invention.

FIG. 7 is a flow chart illustrating exemplary steps for presenting a 1080P60 video that is received in interlaced format without resolution loss, in accordance with an embodiment of the invention. Referring to FIG. 7, the exemplary steps start with step 702, the VRU 300 is capable of decoding a 1080i video. The VRU 300 may be utilized to display a 1080P60 video. In step 704, the VRU 300 may be operable to receive a TS from the VTU 200. The received TS may comprise two ESs that may be created from a 1080P60 video captured by the VTU 200.

In step 706, the transport demultiplexer 312 may be operable to extract the two ESs from the received TS based on corresponding PIDs. In step 708, the VRU 300 may be operable to interlaced decode each of the two ESs to form corresponding 1080i sequences. For example, the video decoder 316*a* and 316*b* may decode corresponding PESs to form the first 1080i video sequence 510 and the second 1080i video sequence 520, respectively. In step 710, the resembler 318 may be operable to assemble the first 1080i video sequence 510 and the second 1080i video sequence 520 to recover or restore the 1080P60 video for display. Frames or pictures of the restored 1080P60 video 410 may be displayed on the display device 320 at the time indicated by corresponding PTS information. The exemplary steps may end in step 712.

Aspects of a method and system for transmitting a 1080P60 video in a 1080i format to a legacy 1080i capable video receiver without resolution loss are provided. In accordance with various embodiments of the invention, the video processing system 100 may be operable to manage video transmission from the VTU 200 to video decoders such as the VRU 300. In instances where a single progressive video such as a single 1080P60 video is captured by the video source unit 210 for transmission to, for example, 1080i capable decoders such as the VRU 300, the VTU 200 may be operable to pre-format the captured 1080P60 video prior to transmission. In this regard, two interlaced video sequences such as the 1080i sequences 510 and 520 may be generated or created from the captured 1080P60 video. The Tx video processor 220 may be operable to process the generated 1080i sequences 510 and 520 for transmission to the VRU 300. The captured 1080P60 video may be expected to be displayed on the display device 320 in progressive format.

The splitter 222 may be operable to split the captured 1080P60 video into a plurality of even-indexed line pictures and odd-indexed line pictures. For example, each frame of the captured 1080P60 video may be split into an even-indexed line picture and an odd-indexed line picture. The splitter 222 may be configured to reassemble lines of the plurality of even-indexed line pictures and odd-indexed line pictures to generate the 1080i sequences 510 and 520. The generated 1080i sequences 510 and 520 may be compressed via the video encoders 224*a* and 224*b*, respectively, utilizing different compression algorithms. For example, the generated 1080i video sequence 510 may be interlaced coded with the top-field first. The generated 1080i video sequence 520 may be interlaced coded with the bottom-field first. Pictures, which originate from the same picture in the captured 1080P60 video, may be synchronized for a progressive display on the display device 320. In this regard, same timestamp information such as DTS and PTS may be embedded or inserted into headers of pictures that originate from the same one of the plurality of pictures in the captured 1080P60 video. Accordingly, the VRU 300 may be operable to decode the synchronized pictures transmitted from the VTU 200 to restore the captured 1080P60 video. The captured 1080P60 video may be displayed on the display device 320 in progressive format.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for transmitting a 1080P60 video in 1080i format to a legacy 1080i capable video receiver without resolution loss.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
    in a video processing system:
    separating each frame of a progressive video stream into an even-indexed line picture and an odd-indexed line picture;
    generating first and second interlaced video sequences from the progressive video stream by:
    combining even-indexed lines of the even-indexed line picture obtained from a frame of the progressive video stream with odd-indexed lines of the odd-indexed line picture obtained from an adjacent frame of the progressive video sequence stream to form a picture in a first interlaced video sequence, the first interlaced video sequence comprising a plurality of pictures; and
    combining odd-indexed lines of the even-indexed line picture obtained from the frame of the progressive video stream with even-indexed lines of the odd-indexed line picture obtained from the adjacent frame of the progressive video stream to form a picture in a second interlaced video sequence, the second interlaced video sequence comprising a plurality of pictures; and transmitting said generated first and second interlaced sequences to a decoder for restoration of the progressive video stream for display in progressive format.

2. The method according to claim 1, wherein said progressive video stream comprises a three dimensional video stream, a two dimensional video stream, or both.

3. The method according to claim 1, comprising compressing said generated first and second video interlaced sequences, respectively, for said transmission.

4. The method according to claim 3, comprising compressing one of said generated first and second video interlaced sequences using interlaced coding with top-field first.

5. The method according to claim 3, comprising compressing one of said generated first and second video interlaced sequences using interlaced coding with bottom-field first.

6. The method according to claim 3, comprising synchronizing pictures that originate from a same one of a plurality of pictures in said progressive video stream in said compressed first and second video interlaced sequences by matching presentation time stamps of the first interlaced video sequence with presentation time stamps of the second interlaced video sequence.

7. The method according to claim 6, wherein said decoder decodes said synchronized pictures in said compressed first and second video interlaced sequences.

8. The method according to claim 7, wherein said decoder restores said progressive video stream from said decoded pictures.

9. The method according to claim 1 wherein the generated first and second video interlaced sequences are transmitted as a single transport stream.

10. The method according to claim 1, wherein the progressive video stream comprises a first view of a stereoscopic progressive video stream for a three-dimensional video program, the three-dimensional program having a second progressive video stream comprising a second view of the stereoscopic progressive video stream, wherein the first and second interlaced video sequences are generated from the progressive video stream comprising the first view of a stereoscopic progressive video stream, wherein third and fourth interlaced video sequences are generated from the second progressive video stream comprising the second view of the stereoscopic progressive video stream.

11. A system for video processing, the system comprising:
    one or more processors, one or more circuits, or any combination thereof for use in a video processing system, said one or more processors, one or more circuits, or any combination thereof being operable to:
    separating each frame of a progressive video stream into an even-indexed line picture and an odd-indexed line picture;
    generate first and second interlaced video sequences from the progressive video stream by:

combining even-indexed lines of the even-indexed line picture obtained from a frame of the progressive video stream with odd-indexed lines of the odd-indexed line picture obtained from an adjacent frame of the progressive video stream to form a picture in a first interlaced video sequence, the first interlaced video sequence comprising a plurality of pictures; and combining odd-indexed lines of the even-indexed line picture obtained from the frame of the progressive video stream with even-indexed lines of the odd-indexed line picture obtained from the adjacent frame of the progressive video stream to form a picture in a second interlaced video sequence, the second interlaced video sequence comprising a plurality of pictures; and transmit said generated first and second interlaced sequences to a decoder for restoration of the progressive video stream for display in progressive format.

12. The system according to claim 11, wherein said progressive video stream comprises a three dimensional video stream, a two dimensional video stream, or both.

13. The system according to claim 11, wherein said one or more processors, one or more circuits, or any combination thereof being operable to compress said generated first and second video interlaced sequences, respectively, for said transmission.

14. The system according to claim 13, wherein said one or more processors, one or more circuits, or any combination thereof being operable to compress one of said generated first and second video interlaced sequences using interlaced coding with top-field first.

15. The system according to claim 13, wherein said one or more processors, one or more circuits, or any combination thereof being operable to compress one of said generated first and second video interlaced sequences using interlaced coding with bottom-field first.

16. The system according to claim 13, wherein said one or more processors, one or more circuits, or any combination thereof being operable to synchronize pictures, originated from a same one of a plurality of pictures in said progressive video stream, in said compressed first and second video interlaced sequences by matching presentation time stamps of the first interlaced video sequence with presentation time stamps of the second interlaced video sequence.

17. The system according to claim 16, wherein said decoder decodes said synchronized pictures in said compressed first and second video interlaced sequence.

18. The system according to claim 11 wherein said one or more processors, one or more circuits, or any combination thereof are operable to transmit said generated first and second video interlaced sequences as a single transport stream.

19. The system according to claim 11, wherein the progressive video stream comprises a first view of a stereoscopic progressive video stream for a three-dimensional video program, the three-dimensional program having a second progressive video stream comprising a second view of the stereoscopic progressive video stream, wherein the first and second interlaced video sequences are generated from the progressive video stream comprising the first view of a stereoscopic progressive video stream, wherein third and fourth interlaced video sequences are generated from the second progressive video stream comprising the second view of the stereoscopic progressive video stream.

20. A method for video processing, the method comprising:
in a video processing system:
generating at least one even indexed line picture from a single progressive video stream;
generating at least one odd indexed line picture from the single progressive video stream;
generating a first interlaced video sequence, the generated first interlaced video sequence comprising even indexed lines of the at least one even indexed line picture and odd indexed lines of the at least one odd indexed line picture;
generating a second interlaced video sequence, the generated second interlaced video sequence comprising odd indexed lines of the at least one even indexed line picture and even indexed lines of the at least one odd indexed line picture; and
transmitting, in interlaced format, said generated first and second interlaced sequences, to a decoder,
wherein said decoder restores said single progressive video stream, from said transmitted first and second interlaced video sequences for display in progressive format.

* * * * *